United States Patent [19]

Hallett

[11] Patent Number: 5,152,610
[45] Date of Patent: Oct. 6, 1992

[54] POOL THERMOMETER

[76] Inventor: Stephen K. Hallett, 3590 Churchill Dr., Carson City, Nev. 89704

[21] Appl. No.: 783,529

[22] Filed: Oct. 28, 1991

[51] Int. Cl.⁵ .................. G01K 1/14; G01K 13/00; G01K 1/08
[52] U.S. Cl. ................... 374/156; 374/141; 374/208; 4/496
[58] Field of Search .............. 374/156, 208, 141; 4/496, 541, 542, 543, 544

[56] References Cited

U.S. PATENT DOCUMENTS

| | | |
|---|---|---|
| 1,668,930 | 5/1928 | Zadek ................ 374/156 |
| 1,883,554 | 10/1932 | Chapman ............ 374/156 |
| 2,282,277 | 5/1942 | Whittier ............. 374/156 |
| 3,961,531 | 6/1976 | Peng ................. 374/156 |
| 4,030,361 | 6/1977 | Fortune .............. 374/156 |
| 4,169,378 | 10/1979 | DeMarchi et al. ..... 374/156 |
| 4,435,095 | 3/1984 | Jones et al. ......... 374/208 |
| 4,503,563 | 3/1985 | Johnson .............. 374/208 |
| 4,601,589 | 7/1986 | Meisner .............. 374/208 |
| 4,738,549 | 4/1988 | Plimpton ............. 374/156 |
| 4,973,170 | 11/1990 | Bescherer et al. ..... 374/208 |

FOREIGN PATENT DOCUMENTS

| | | |
|---|---|---|
| 0460100 | 5/1928 | Fed. Rep. of Germany ...... 374/156 |
| 1115959 | 5/1956 | France ................ 374/156 |
| 0109728 | 6/1925 | Switzerland .......... 374/156 |

OTHER PUBLICATIONS

"Aquacide's Duck-O-Meter", Spa and Sauna, p. 93 (Aug 1988).

Primary Examiner—William A. Cuchlinski, Jr.
Assistant Examiner—Diego F. F. Gutierrez
Attorney, Agent, or Firm—Leon Gilden

[57] ABSTRACT

A fluid impermeable housing includes a lower support body receiving a battery, with an upper body portion mounting a printed circuit board containing a light-emitting diode panel for indication of temperature with the light-emitting diode panel operative through the printed circuit board and a temperature sensor directed through the housing to effect indication of ambient pool water temperature. The organization includes a threadedly securable lower and upper cap permitting access to the components of the organization for maintenance and replacement of various portions thereof. A modification of the invention includes cup support structure arranged on diametrically opposed sides of the support housing utilizing the temperature indication of the light-emitting diode panel for indication of ambient pool water temperature. The cup support structure includes a cup holder wherein drinking cups may be mounted. Suction cup structure is provided mounted to each cup holder to permit securement of the organization to a side wall of an associated swimming pool, wherein each cup holder may further be provided with stabilizing ballast anchor weights suspended relative to each cup holder for maintaining proper orientation of the organization in use.

4 Claims, 4 Drawing Sheets

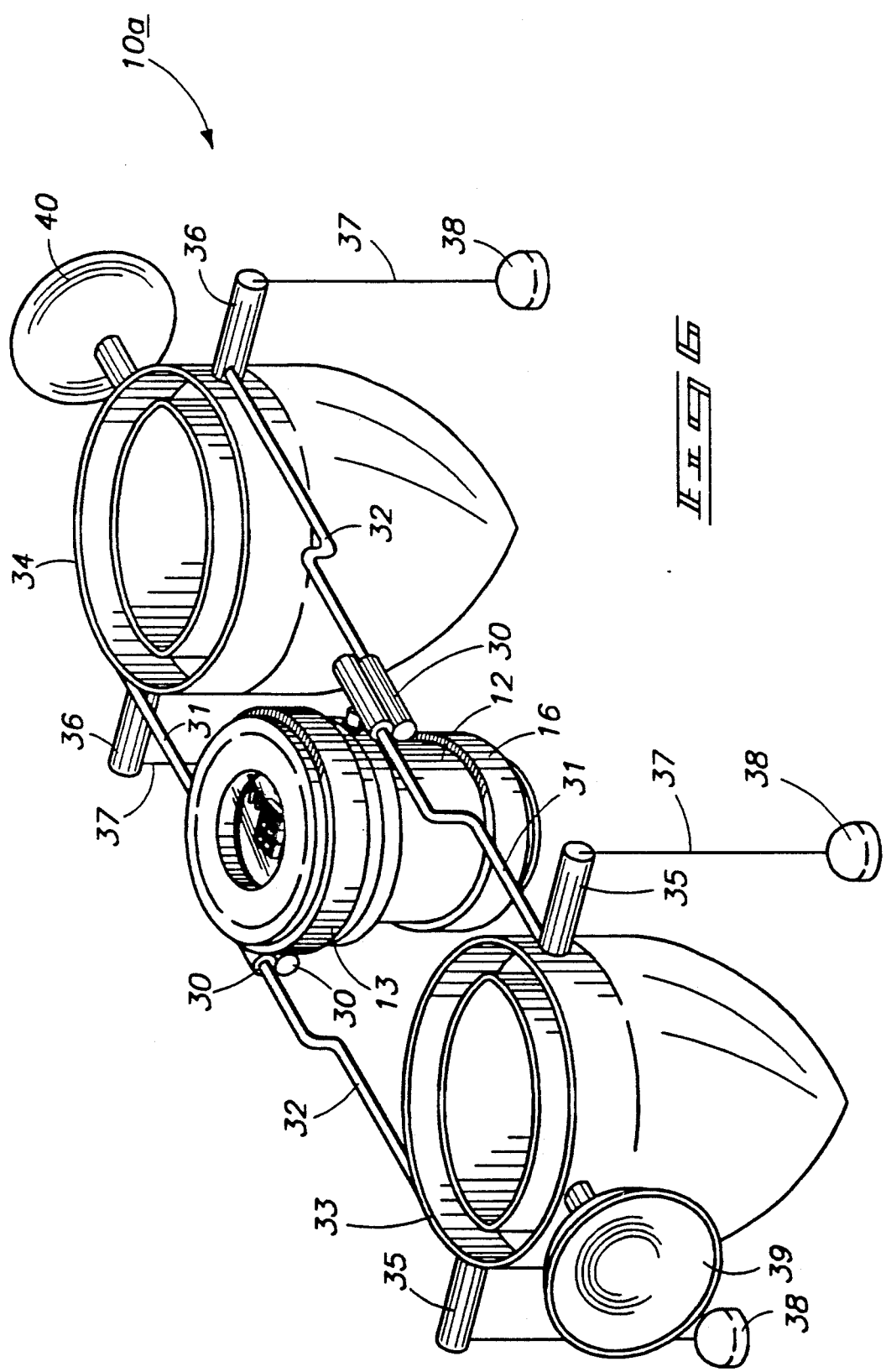

5,152,610

POOL THERMOMETER

BACKGROUND OF THE INVENTION

1. Field of the Invention

The field of invention relates to temperature sensor apparatus, and more particularly pertains to a new and improved pool thermometer apparatus wherein the same is arranged for providing visual observation of ambient pool water temperature.

2. Description of the Prior Art

Various pool temperature devices are utilized in the prior art for providing indication of temperature within a pool, such as a hot tub, swimming pool, and the like. Such prior art structure is exemplified in U.S. Pat. No. 4,738,549 to Plimpton setting forth a pool temperature utilizing a liquid crystal display for indication of pool water temperature.

U.S. Pat. No. 4,030,361 to Fortune sets forth a floating bath device utilizing a needle member for providing mechanical rotation about an axle for indication of pool temperature.

U.S. Pat. No. 4,169,378 to Dimarchi, et al. sets forth an aquarium thermometer arranged for vertical emergence within an aquarium body of water.

U.S. Pat. No. 3,873,446 to Campbell sets forth a swimming pool thermometer utilizing an axially arranged recess for receiving water for contact with a temperature sensor probe of an associated mechanical needle deflection thermometer.

U.S. Pat. No. 3,520,189 to Mann sets forth a thermometer utilizing various colorations within a stem that projects exteriorly of the water for indication of temperature within the water.

As such, it may be appreciated that there continues to be a need for a new and improved pool thermometer apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of temperature apparatus now present in the prior art, the present invention provides a pool thermometer apparatus wherein the same is arranged to provide a fluid impermeable chamber arranged with a light-emitting diode display for indication of ambient pool water temperature. As such, the general purpose of the present invention, which will be described subsequently in greater detail, is to provide a new and improved pool thermometer apparatus which has all the advantages of the prior art temperature apparatus and none of the disadvantages.

To attain this, the present invention provides a fluid impermeable housing including a lower support body receiving a battery, with an upper body portion mounting a printed circuit board containing a light-emitting diode panel for indication of temperature with the light-emitting diode panel operative through the printed circuit board and a temperature sensor directed through the housing to effect indication of ambient pool water temperature. The organization includes a threadedly securable lower and upper cap permitting access to the components of the organization for maintenance and replacement of various portions thereof. A modofication of the invention includes cup support structure arranged on diametrically opposed sides of the support housing utilizing the temperature indication of the light-emitting diode panel for indication of ambient pool water temperature. The cup support structure includes a cup holder wherein the drinking cup may be mounted. Suction cup structure is provided mounted to each cup holder to permit securement of the organization to a side wall of an associated swimming pool, wherein each cup holder may further be provided with stabilizing ballast anchor weights suspended relative to each cup holder for maintaining proper organization in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore that the claim be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pool thermometer apparatus which has all the advantages of the prior art temperature apparatus and none of the disadvantages.

It is another object of the present invention to provide a new and improved pool thermometer apparatus which may be easily and efficiently manufactured and marketed.

It is a further object of the present invention to provide a new and improved pool thermometer apparatus which is of a durable and reliable construction.

An even further object of the present invention is to provide a new and improved pool thermometer apparatus which is susceptible of a low cost of manufacture with regard to both materials and labor, and which accordingly is then susceptible of low prices of sale to the consuming public, thereby making such pool thermometer apparatus economically available to the buying public.

Still yet another object of the present invention is to provide a new and improved pool thermometer apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a isometric illustration of a modification of the invention.

DESCRIPTION OF THE PREFERRED EMBODIMENT

Figure 1:
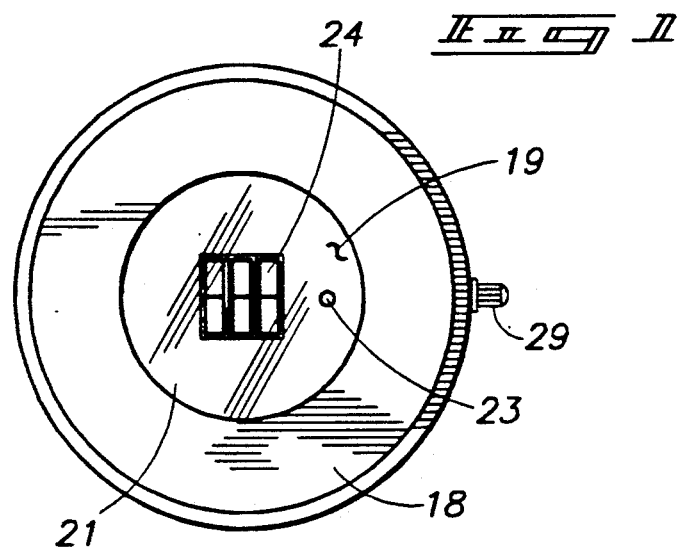
FIG. 1 is an orthographic top view of the support housing utilized by the invention.
Figure 2:
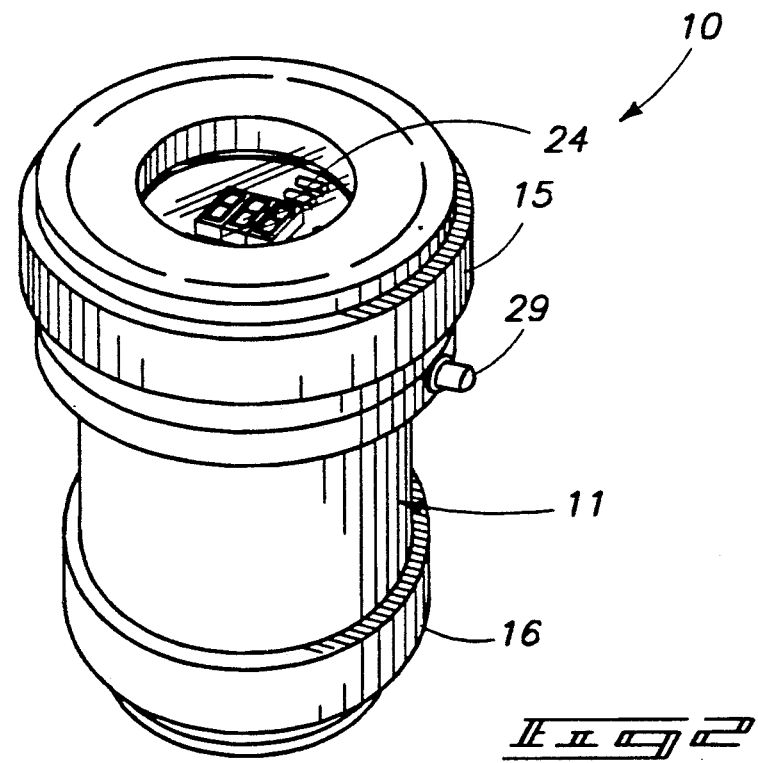
FIG. 2 is an isometric illustration of the support housing utilized by the invention.
Figure 3:
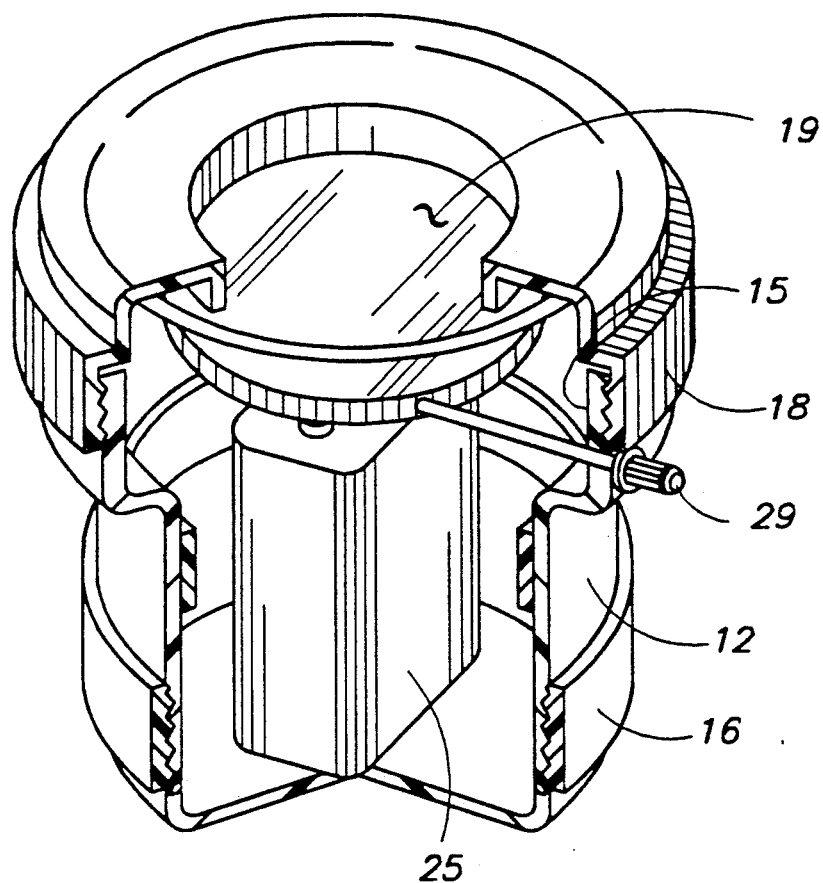
FIG. 3 is an isometric view, partially in section, of the support housing structure of the invention.
Figure 5:
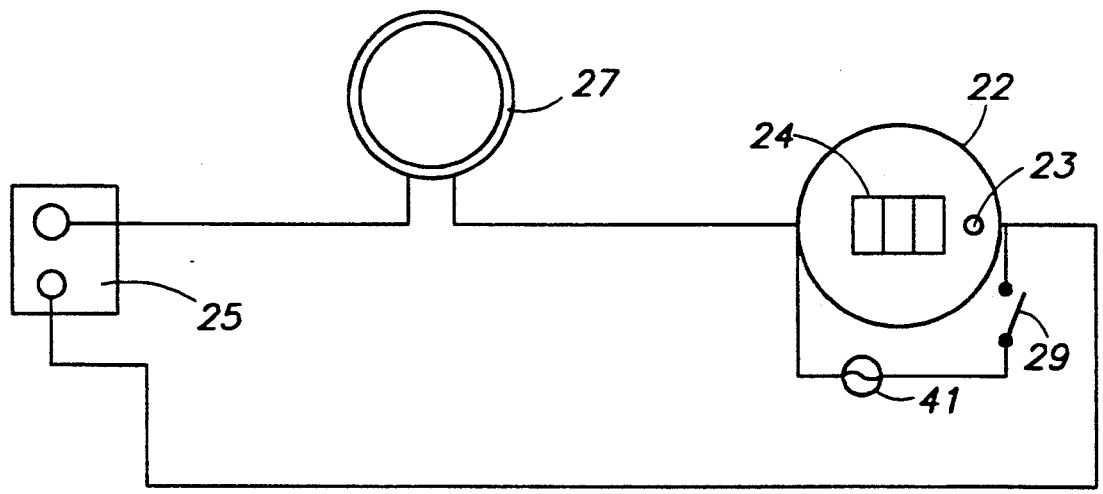
FIG. 5 is a diagrammatic illustration of the circuitry utilized by the invention.
Figure 4:
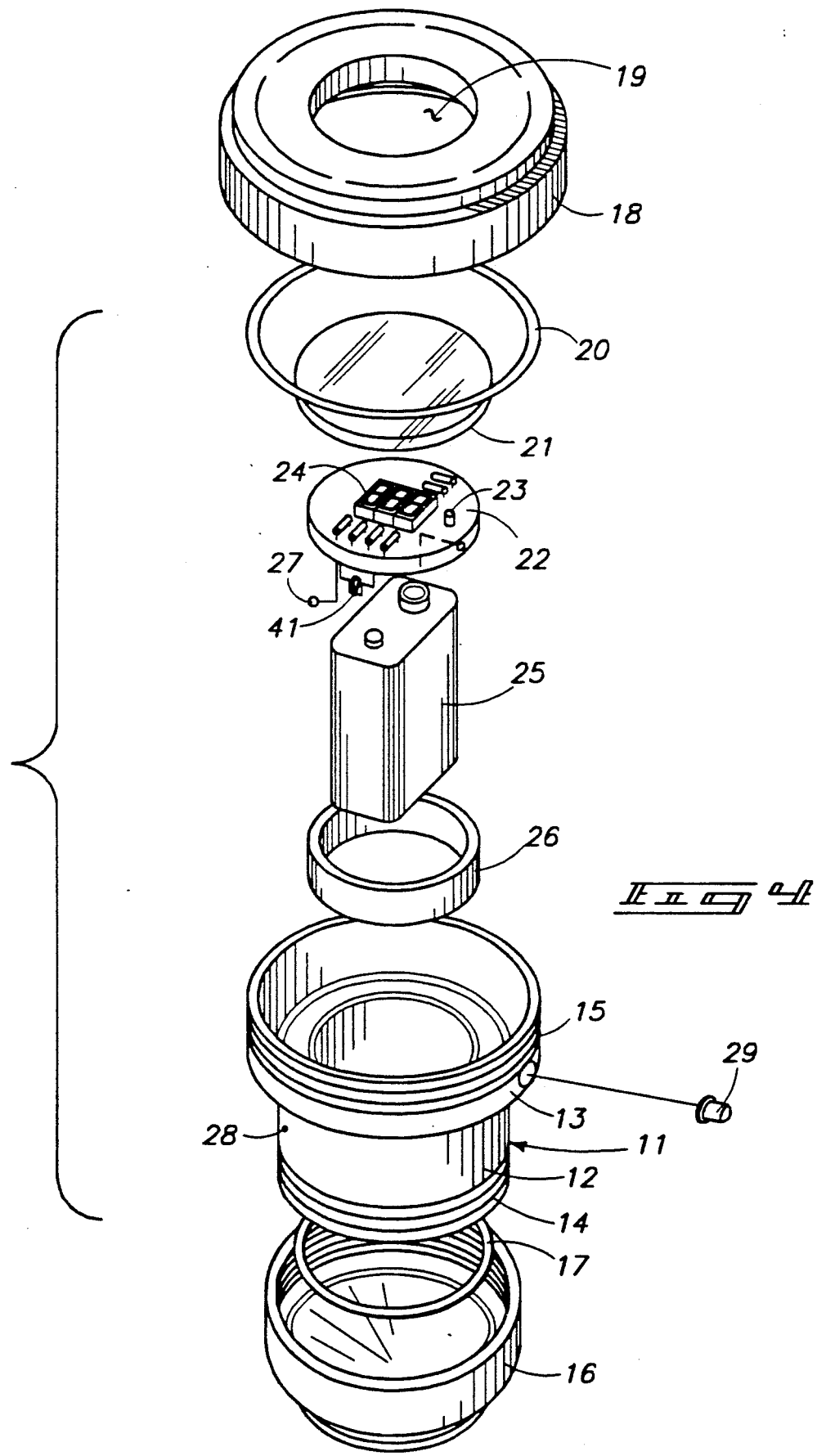
FIG. 4 is an isometric exploded illustration of the housing structure of the invention.

With reference now to the drawings, and in particular to FIGS. 1 to 6 thereof, a new and improved pool thermometer apparatus embodying the principles and concepts of the present invention and generally designated by the reference numerals 10 and 10a will be described.

More specifically, the pool thermometer apparatus 10 of the instant invention essentially comprises a support housing 11 that includes a central cylindrical body 12 coaxially aligned with an upper cylindrical body 13, wherein the central cylindrical body 12 is defined by a first diameter and the upper cylindrical body 13 is defined by a second diameter greater than the first diameter. The central cylindrical body 12 includes a lower threaded housing end 14, with the upper cylindrical body 13 including an upper threaded housing end 15. A lower internally threaded cap 16 coopeartes with the lower threaded housing 14 and including a lower cap seal 17 interfitting between the lower threaded housing end 14 and lower internally threaded cap 16 to effect a fluid impermeable at a lower terminal end of the support housing 11. The upper threaded housing end 15 coopeartes with an upper internally threaded cap 18, including an upper cap seal 20 to effect a fluid-tight relationship between the cap 18 and the housing 11. The upper 18 includes a central opening 19 fixedly mounting a transparent lens 21 coxially aligned therewithin to overlie a printed circuit board 22. The printed circuit board 22 includes a light-emitting diode panel 24 that is operative through a temperature sensor 27 projecting through a temperature sensor sealed aperture 28 through the central cylindrical body 12 for providing detection of ambient water temperature. A battery 25 is mounted below the printed circuit board 22 coaxially aligned within the central cylindrical body 12 defining a center of gravity of the support housing. The elongated battery 25 is mounted by an alignment band 26 that complementarily receives the battery 25 and maintains alignment of the battery 25 by the alignment band 26, including an external diameter substantially equal to the first diameter. An on/off switch 29 is operative with an illumination bulb 41 to effect selective illumination of the bulb below the translucent printed circuit board 22 permitting saving of electrical potential within the battery 25 as required.

In this manner, the support housing 11 defines a fluid impermable cavity between the upper cap 18 and the lower cap 16, with the battery 25 contained within the central cylindrical body 12 to orient the organization in a vertical manner within an associated body of water.

A modification of the invention set forth as 10a as illustrated in FIG. 6 to include plural pairs of socket tubes 30 fixedly mounted on diametrically opposed sides of the upper cylindrical body 13. Socket tube 30 of each pair of socket tubes includes a respective first and second support rod 31 and 32 extending an opposing direction tangentially aligned with the upper cylindrical body 13, wherein a respective first and second support rod 31 and 32 arranged in a parallel relationship mount a respective first and second cup holder 33 and 34. The cup holders permit reception of various drinking containers therewithin.

Each cup holder includes a plural pair of support posts defined by first and second pairs of support posts 35 and 36 of the respective first and second cup holders 33 and 34. The support post 35 and 36 are othogonally oriented relative to the respective first and second support rods 31 and 32 that intersect the support posts, wherein each distal terminal end of each support post includes an anchor tether line 37 mounting an anchor weight 38, wherein the anchor weights at each distal end of each support post provides ballast and alignment of the support housing 11 and the first and second cup holders 33 and 34 within a body of water. Further, a respective first and second suction cup 39 and 40 is provided and mounted to an upper circumferential perimeter of each respective first and second cup holder to permit securement to an associated side wall of a swimming pool and the like for maintaining desired orientation of the structure during use as a cup holder apparatus.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pool thermometer apparatus, comprising.
a support housing, the support housing including a central cylindrical body, with an upper cylindrical body fixedly and coaxially mounted to an upper terminal end of the central cylindrical body, with the central cylindrical body defined by a first diameter, and the upper cylindrical body defined by a second diameter greater than the first diameter, and
the central cylindrical body including a lower threaded housing end, and the upper cylindrical body including an upper threaded housing end, and
a lower internally threaded cap threadedly secured to the lower threaded housing end, and
an upper internally threaded cap threadedly secured to the upper threaded housing end, with the upper cap including a central opening, the central opening fixedly mounting a transparent lens coaxially relative to the central opening, and
the central cylindrical body including an elongate battery member mounted within the central cylindrical body defining a center of gravity of the support housing, and
a printed circuit board including a light-emitting diode panel operative through a temperature sensor directed through the central cylindrical body for effecting visual indication of ambient temperature by the light-emitting diode panel, and
the printed circuit board formed of a translucent material positioned above the battery and positioned within the upper cylindrical body adjacent to and below the transparent lens, with a fluid impermeable cavity defined between the transparent lens and the lower internally threaded cap, and
an illumination bulb mounted within the support housing below the translucent printed circuit board, and
an on/off switch mounted to the upper body for effecting selective actuation of the illumination bulb.

2. An apparatus as set forth in claim 1 wherein the upper cylindrical body includes a plurality of socket tube pairs, and the central cylindrical body and the upper cylindrical body defining a support housing axis, and each pair of socket tubes arranged on diametrically opposed sides of the upper cylindrical body orthogonally oriented relative to the axis, and each pair of socket tubes including respective first and second support rods extending in opposite directions tangentially aligned with the upper cylindrical body, and paid first and second support rods positioned on diameterically opposed sides of the support housing defining respective first and second pairs of support rods, and the first pair of support rods mounting a first cup holder, and the second pair of support rods mounting a second cup holder.

3. An apparatus as set forth in claim 2 wherein the first cup holder includes a first pair of support posts extending radially and exteriorly of the first cup holder orthogonally oriented relative to the first pair support rods, and the second cup holder including a second pair of support posts extending radially and exteriorly of the second cup holder orthogonally oriented relative to the second pair of support rods, and each support post of said first and second pair of support posts includes an anchor tether line, and each lower distal end of each anchor tether line mounting an anchor weight to effect stability to the first and second cup holder and the support housing when immersed in a body of water.

4. An apparatus as set forth in claim 3 wherein the first cup holder includes a first suction cup member fixedly mounted to an upper terminal end of the first cup holder positioned between the first pair of support posts, and the second cup holder including a second suction cup fixedly mounted to an upper terminal end of the second cup holder between the second pair of support posts.

* * * * *